United States Patent
Lopatin et al.

(10) Patent No.: US 9,936,344 B2
(45) Date of Patent: Apr. 3, 2018

(54) MANAGING LOCATION SHARING REQUESTS

(71) Applicant: Apple Inc., Cupertino, CA (US)

(72) Inventors: Scott Lopatin, San Francisco, CA (US); Emmanuel Lalande, San Francisco, CA (US); Navin Bindiganavile Suparna, Cupertino, CA (US); Raghunandan K. Pai, Cupertino, CA (US); Sarish Jain, Sunnyvale, CA (US); Siva Ganesh Movva, Cupertino, CA (US); Tommy Rochette, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/273,550

(22) Filed: Sep. 22, 2016

(65) Prior Publication Data

US 2017/0359681 A1 Dec. 14, 2017

Related U.S. Application Data

(60) Provisional application No. 62/348,687, filed on Jun. 10, 2016.

(51) Int. Cl.
*H04W 4/02* (2009.01)
*H04W 4/20* (2009.01)

(52) U.S. Cl.
CPC ............ *H04W 4/02* (2013.01); *H04W 4/20* (2013.01); *H04W 4/21* (2018.02); *H04W 4/80* (2018.02)

(58) Field of Classification Search
CPC ................................ H04W 4/02; H04W 4/206
(Continued)

(56) References Cited

U.S. PATENT DOCUMENTS 6,166,688 A 12/2000 Cromer et al.
6,643,781 B1 11/2003 Merriam
(Continued)

FOREIGN PATENT DOCUMENTS

EP 2528360 11/2012

OTHER PUBLICATIONS

International Search Report and Written Opinion of the International Application No. PCT/US2017/022276, dated May 30, 2017, 13 pages.

*Primary Examiner* — Inder Mehra
(74) *Attorney, Agent, or Firm* — Fish & Richardson P.C.

(57) ABSTRACT

Systems, methods, devices and computer-readable storage mediums are disclosed for managing location sharing requests. In various implementations, a requesting device or a server computer in communication with the requesting device, receives a location sharing request associated with a user and, in response, sends a notification to a companion device associated with the user. A location of the companion device is received from the companion device together with a list of one or more devices associated with the user that are paired with the companion device and a connection status for at least one of the one or more paired devices. The connection status indicates if there is a direct communication link established between the paired device and the companion device. A notification is sent to each disconnected paired device based on the connection status. Each disconnected device that is worn or carried by the user responds with their location.

18 Claims, 4 Drawing Sheets

(58) Field of Classification Search
USPC ..... 455/414.2, 414.3, 456.1, 456.2; 709/204, 709/206
See application file for complete search history.

(56) References Cited

U.S. PATENT DOCUMENTS

| | | |
|---|---|---|
| 6,662,023 B1 | 12/2003 | Helle |
| 7,890,083 B2 | 2/2011 | Chandran |
| 9,253,616 B1 | 2/2016 | Haney |
| 2012/0131106 A1* | 5/2012 | Pousti ................ G06Q 10/107 709/205 |
| 2013/0290522 A1 | 10/2013 | Behm, Jr. |
| 2014/0273921 A1 | 9/2014 | Li et al. |
| 2015/0072704 A1 | 3/2015 | Colby et al. |
| 2015/0170504 A1 | 6/2015 | Jooste |
| 2015/0281009 A1* | 10/2015 | Melcher ................ G06T 11/206 709/224 |
| 2015/0289108 A1 | 10/2015 | Sandel et al. |
| 2016/0189143 A1* | 6/2016 | Koeppel ............ G06K 19/0739 705/41 |
| 2017/0093882 A1* | 3/2017 | Khuu .................... H04L 63/12 |

* cited by examiner

MANAGING LOCATION SHARING REQUESTS

CROSS-REFERENCE TO RELATED APPLICATION

This application claims priority to U.S. Provisional Patent Application No. 62/348,687, filed Jun. 10, 2016, the entire contents of which are incorporated herein by reference.

TECHNICAL FIELD

This disclosure relates generally to location tracking of electronic devices.

BACKGROUND

An application for mobile devices that has found widespread appeal to many users is location sharing where a user can request another user's location. For example, the "Find My Friends" application developed by Apple Inc. of Cupertino, Calif., allows users to follow and track people with their iOS device. Users can also share their location with other users. A user's location is determined by their mobile device using a global navigation satellite system (GNSS), a wireless network (e.g., Wi-Fi access point transmissions) or cellular positioning system (e.g., cell tower transmissions). Location request notifications appear on a display of the user's mobile device in response to a request for their location. A user can set up location-based alerts that can notify the user automatically when a friend arrives at a particular destination (e.g., the airport, school, home, work) or about changes in a friend's location.

SUMMARY

Systems, methods, devices and computer-readable storage mediums are disclosed for managing location sharing requests.

In an implementation, a method comprises: receiving, from a requesting device or a server computer in communication with the requesting device, a first location sharing request associated with a user; sending a notification to a companion device associated with the user; receiving, from the companion device, a location of the companion device, a list of one or more devices associated with the user that are paired with the companion device and a connection status for at least one of the one or more paired devices, the connection status indicating whether or not there is a direct communication link established between the paired device and the companion device; sending a notification to each disconnected paired device based on the connection status; receiving, from the disconnected paired device, a location of the disconnected device and data indicating whether or not the device is worn or carried by the user; and responsive to the data indicating that the device is worn or carried by the user, sending to the requesting device or the server computer the location of the disconnected device, and responsive to the data indicating that the device is not worn or carried by the user, sending to the requesting device or server computer the location of the companion device.

In an implementation, a system comprises: one or more processors; memory operable to store instructions, which, when executed by the one or more processors, causes the one or more processors to perform operations comprising: receiving, from a requesting device or a server computer in communication with the requesting device, a first location sharing request associated with a user; sending a notification to a companion device associated with the user; receiving, from the companion device, a location of the companion device, a list of one or more devices associated with the user that are paired with the companion device and a connection status for at least one of the one or more paired devices, the connection status indicating whether or not there is a direct communication link established between the paired device and the companion device; sending a notification to each disconnected paired device based on the connection status; receiving, from the disconnected paired device, a location of the disconnected device and data indicating whether or not the device is worn or carried by the user; and responsive to the data indicating that the device is worn or carried by the user, sending to the requesting device or the server computer the location of the disconnected device, and responsive to the data indicating that the device is not worn or carried by the user, sending to the requesting device or server computer the location of the companion device.

In an implementation, a non-transitory, computer-readable storage medium having instructions stored thereon, which, when executed by one or more processors, causes the one or more processors to perform operations comprising: receiving, from a requesting device or a server computer in communication with the requesting device, a first location sharing request associated with a user; sending a notification to a companion device associated with the user; receiving, from the companion device, a location of the companion device, a list of one or more devices associated with the user that are paired with the companion device and a connection status for at least one of the one or more paired devices, the connection status indicating whether or not there is a direct communication link established between the paired device and the companion device; sending a notification to each disconnected paired device based on the connection status; receiving, from the disconnected paired device, a location of the disconnected device and data indicating whether or not the device is worn or carried by the user; and responsive to the data indicating that the device is worn or carried by the user, sending to the requesting device or the server computer the location of the disconnected device, and responsive to the data indicating that the device is not worn or carried by the user, sending to the requesting device or server computer the location of the companion device.

In an implementation, a device comprises: one or more processors; a wireless communications interface; a location processor; memory operable to store instructions, which, when executed by the one or more processors, causes the one or more processors to perform operations comprising: receiving, through the wireless communications interface, a location sharing request from a requesting device or server computer in communication with the requesting device; determining connection status for one or more paired devices; generating a list of the one or more paired devices and their respective connection status; sending the list to the requesting device or server computer; obtaining a current location of the device using the location processor; and sending the list and the current location to the requesting device or server computer through the wireless communications interface.

Particular implementations disclosed herein provide one or more of the following advantages. Location sharing applications can provide more accurate user locations when the user is wearing or carrying a device paired with a companion device.

The details of the disclosed implementations are set forth in the accompanying drawings and the description below.

Other features, objects and advantages are apparent from the description, drawings and claims.

DESCRIPTION OF DRAWINGS

The same reference symbol used in various drawings indicates like elements.

DETAILED DESCRIPTION

Example System

Figure 1:
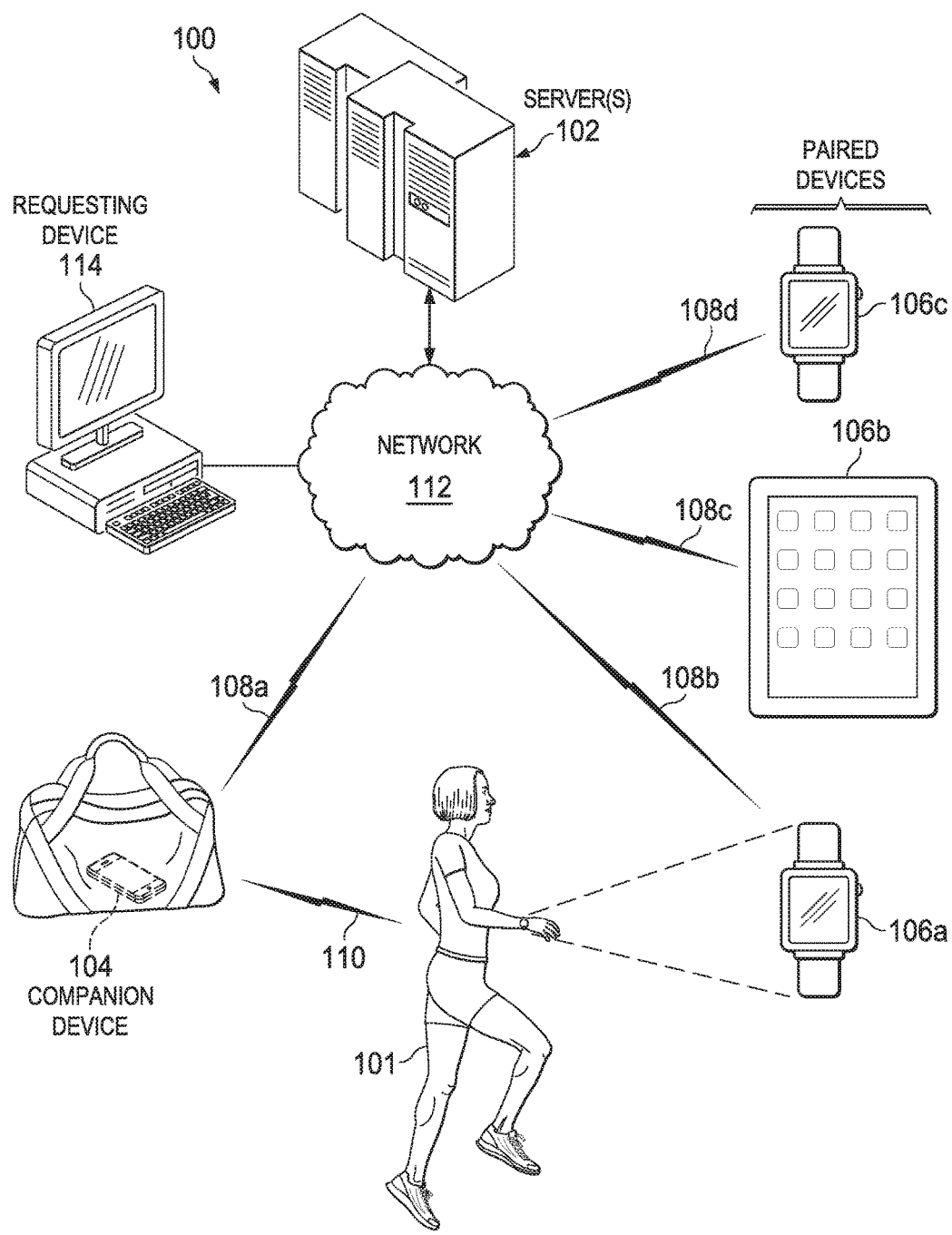
FIG. 1 is a block diagram of an example system for managing location sharing requests, according to an embodiment.

FIG. 1 is a block diagram of an example system 100 for managing location sharing requests, according to an embodiment. System 100 includes server computer(s) 102, companion device 104 and devices 106a-106c. Server computer(s) 102, companion device 104 and devices 106a-106c are connected by wireless communications links 108a-108d to network 112. Network 112 can be a wide area network (WAN) such as the Internet. Companion device 104 also communicates directly with paired device 106a through wireless communications link 110.

Server computer(s) 102 can operate as part of a cloud computing service. A cloud computing service is any resource that is provided over a network (e.g., the Internet). Some examples of cloud computing services include but are not limited to Software as a Service (SaaS), Platform as a Service (PaaS) and Infrastructure as a Service (IaaS). Server computer(s) 102 can be implemented as a single server or multiple servers in a distributed system and can be operated by one or more service providers.

Companion device 104 can be any computing device (e.g., a smartphone, tablet computer, wearable computer) that is operable to connect to network 112 through wireless communications link 108a and directly to device 106a through wireless communications link 110. In the example system 100 shown, companion device 104 is a smartphone, which can include the device architecture shown in FIG. 5. Wireless communications link 108a can be any wireless communication medium, including but not limited to radio frequency (RF) (e.g., cellular, Wi-Fi), optical, microwave and infrared mediums. In this example, wireless communications link 108a is a cellular communications link and can access the Internet through, for example, a cell tower and gateway (not shown).

Devices 106a-106c can be any device (e.g., wearable computer, fitness device, tablet computer) operable to communicate with network 112 over wireless communication links 108b-108d, respectively and directly with companion device 104 over wireless communication link 110. In the example system 100, wireless communications link 110 is a direct communication link that uses short-wavelength radio waves (e.g., UHF radio waves in the ISM band 2.4 to 2.485 GHz). An example wireless communications link 110 is a Bluetooth wireless communications link. As used herein, a "paired device" is a device that has been linked or associated with companion device 104 to allow direct wireless communications between the companion device and the paired device. In the example system 100, companion device 104 is "paired" with devices 106a-106c using Bluetooth pairing technology. Hereinafter, devices 106a-106c will be referred to as "paired devices" to distinguish these devices from companion device 104. In some embodiments, companion device 104 can be "paired" with another companion device, such as a wireless router or hub. Devices 106a-106c can include the device architecture shown in FIG. 5.

Example Use Case—User Jogging

A user owns the three paired devices 106a-106c. Each of devices 106a-106c has been paired with companion device 104 and registered with an online location sharing application or service associated with server computer(s) 102. The user has decided to go jogging and has left her companion device 104 (a smartphone) in her gym bag. The user is wearing device 106a (a smartwatch) on her wrist. Companion device 104 includes one or more microprocessors that execute instructions which cause wireless communications link 110 to be monitored continuously, periodically or response to a trigger event. The monitoring can include calculating one or more of a received signal strength indicator (RSSI), signal-to-noise (SNR) ratio, communication frame failure rate or any other metric that can be used to determine if device 106a is connected or disconnected from companion device 104. For purposes of this disclosure, disconnected status means device 106a is out of communication range of companion device 104, such that paired device 106a is no longer capable of communicating information other over wireless communications link 110. Companion device 104 generates and maintains a list of paired devices and their corresponding connection status that were discovered during the monitoring. An example list is shown below in TABLE I for the example use case where each of devices 106a-106c is paired with companion device 104 and has disconnected status

TABLE I

Example List of Paired Device Information

| DEVICE ID | PAIRED STATUS | CONNECTION STATUS |
|---|---|---|
| 106a | PAIRED | DISCONNECTED |
| 106b | PAIRED | DISCONNECTED |
| 106c | PAIRED | DISCONNECTED |

Companion device 104 includes a location processor that is configured to estimate the current location of the companion device 104. The location processor can estimate the location of companion device 104 from various signal sources, including but not limited to GNSS signals, wireless network signals (e.g., Wi-Fi access point signals), cellular data (e.g., cell tower signals), beacon signals (e.g., Bluetooth Low Energy Beacons) and/or any other signal source that can be used to estimate the location of companion device 104. Companion device 104 also includes a wireless transceiver that allows companion device 104 to send and receive information to and from server computers(s) 102 though wireless communications link 108a and to and from paired device 106a through wireless communications link 110.

Paired device 106a also includes a location processor that is configured to estimate the current location of paired device 106a. The location processor is coupled to signal source receivers and is configured to estimate the location of paired device 106a from various signal sources, including but not limited to GNSS signals, wireless network signals (e.g., Wi-Fi access point signals), cellular signals (e.g., cell tower signals), beacon signals (e.g., Bluetooth Low Energy Beacons) and/or any other signal source that can be used to estimate the location of paired device 106a. Paired device 106a also uses a wireless transceiver to send and receive information to and from server computer(s) 102 though wireless communications link 108b and to and from companion device 104 through wireless communications link 110.

In this example jogging scenario, a first user of a requesting device 114 sends a location sharing request to server computer(s) 102. Requesting device 114 can be any wired or wireless device capable of communicating with server computer(s) over network 112. The location sharing request identifies a second user for which location data is requested by the first user. A location sharing application running on server computer(s) 102 uses a notification system to notify companion device 104 that a location sharing request from the first user is pending. In some cases, a text notification is sent which is displayed on a display screen of companion device 104. The text notification asks the second user to accept the location sharing request from the first user. In some embodiments, one or more authentication processes are performed by server computer(s) 102 and/or companion device 104 and/or paired device 106a before location of companion device 104 or paired device 106a is sent to server computer(s) 102.

In response to the location sharing request, companion device 104 sends a list of paired devices 106a-106c and their respective connection status to server computer(s) 102. The current location of companion device 104 is also sent to server computer(s) 102 as part of the list or in a separate transmission. The list and current location of companion device 104 is received by server computer(s) 102 and processed by the location sharing application running on server computer(s) 102. The location sharing application requests the notification system to send notifications to each of paired devices 106a-106c on the list that have disconnected status, which in this example includes all three paired devices 106a-106c. In an embodiment, the location sharing application previously obtained and stored user and/or device identifiers (e.g., a telephone number or UUID) for companion device 104 and each of paired devices 106a-106c. For example, companion device 104 and paired devices 106a-106c may have been previously registered with the location sharing application by the second user using appropriate security and privacy procedures and protocols. The disconnection status in the list (TABLE I) indicates that each of devices 106a-106c is paired with companion device 104 and is disconnected (e.g., out of communication range) of companion device 104.

In response to their respective notifications from server computer(s) 102, each of devices 106a-106c (assuming each device is connected to server computer(s) 102) sends a reply message to server computer(s) 102 indicating disconnected status and a "body" status indicating whether the device 106a-106c is on or off the body of the second user. For purposes of this disclosure, on body status means the paired device is worn by the second user or carried by the current user in their hand, fanny pack, pocket or other carrier. Off body status means the opposite of on body status and indicates that the paired device is neither worn nor carried by the user. Various sensors implemented in paired devices 106a-106c can be used to determine whether devices 106a-106c is on the body of the second user. For example, one or more of an accelerometer, rate gyro, proximity sensor, light sensor, heat sensor, biometric sensor, heart rate or pulse monitor, can be used to detect whether the second user is wearing or carrying paired devices 106a-106c.

In this example use case, paired devices 106a, 106b respond to their respective notifications with disconnected status and off body status and paired device 106a responds to its notification with disconnected and on body status. In some cases, a paired device may not be connected to server computer(s) 102. In these cases, no response to the notification is returned by the paired device to server computer(s) 102. If after several attempts to get a response and/or if an expiration of a time window occurs, server computer(s) 102 will register paired devices 106a, 106b as disconnected and off body. In this example use case, paired device 106a is a smartwatch worn on the user's wrist and therefore sends a reply to its respective notification that indicates disconnected status and on body status. Additionally, device 106a estimates its location using its onboard location processor and signal source receivers and sends the estimated location to server computer(s) 102 in the reply or in a separate transmission. Example responses to notifications are shown in TABLE II.

TABLE II

Example Replies From Paired Devices

| DEVICE ID | CONNECTED STATUS | BODY STATUS | REPLY STATUS |
|---|---|---|---|
| 106a | DISCONNECTED | ON BODY | YES |
| 106b | DISCONNECTED | OFF BODY | YES |
| 106c | — | — | NO |

Referring to TABLE II, device 106a replies with disconnected status and on body status, device 106b responds with disconnected status and off body status and device 106c does not respond to its notification. Because device 106c did not reply to its respective notification its connection status and body status is indeterminate. The failure of device 106c to reply can be due to device 106c not being connected to server computer(s) 102 or disabled (e.g., low power, wireless transceiver is turned off, no cellular service, etc.).

In addition to providing a connection status and body status, device 106a also sends its location to server computer(s) 102 where the location is stored by server computer(s) 102 in, for example, one or more databases. Server computer(s) 102 then sends the location of device 106a to requesting device 114. In some embodiments, when a first request for the location of the second user is received by server computer(s) 102, server computer(s) 102 starts a timer. If subsequent requests for the location of the second user are made by requesting device 114 or another requesting device within a time window and no responses are received, then the previously stored location of device 106a is sent to requesting device 114 or other requesting device. If a subsequent request for location sharing is made by requesting device 114 or another requesting device after the time window expires, then the location of companion device 104 is sent to requesting device 114 or other requesting device. In some cases, none of the paired devices reply to their respective notifications or none of the devices report being disconnected from companion device 104 and on the user's body. In these cases, server computer(s) 102 can send the location of companion device 104 to requesting device 114.

Example Process

Figure 2:
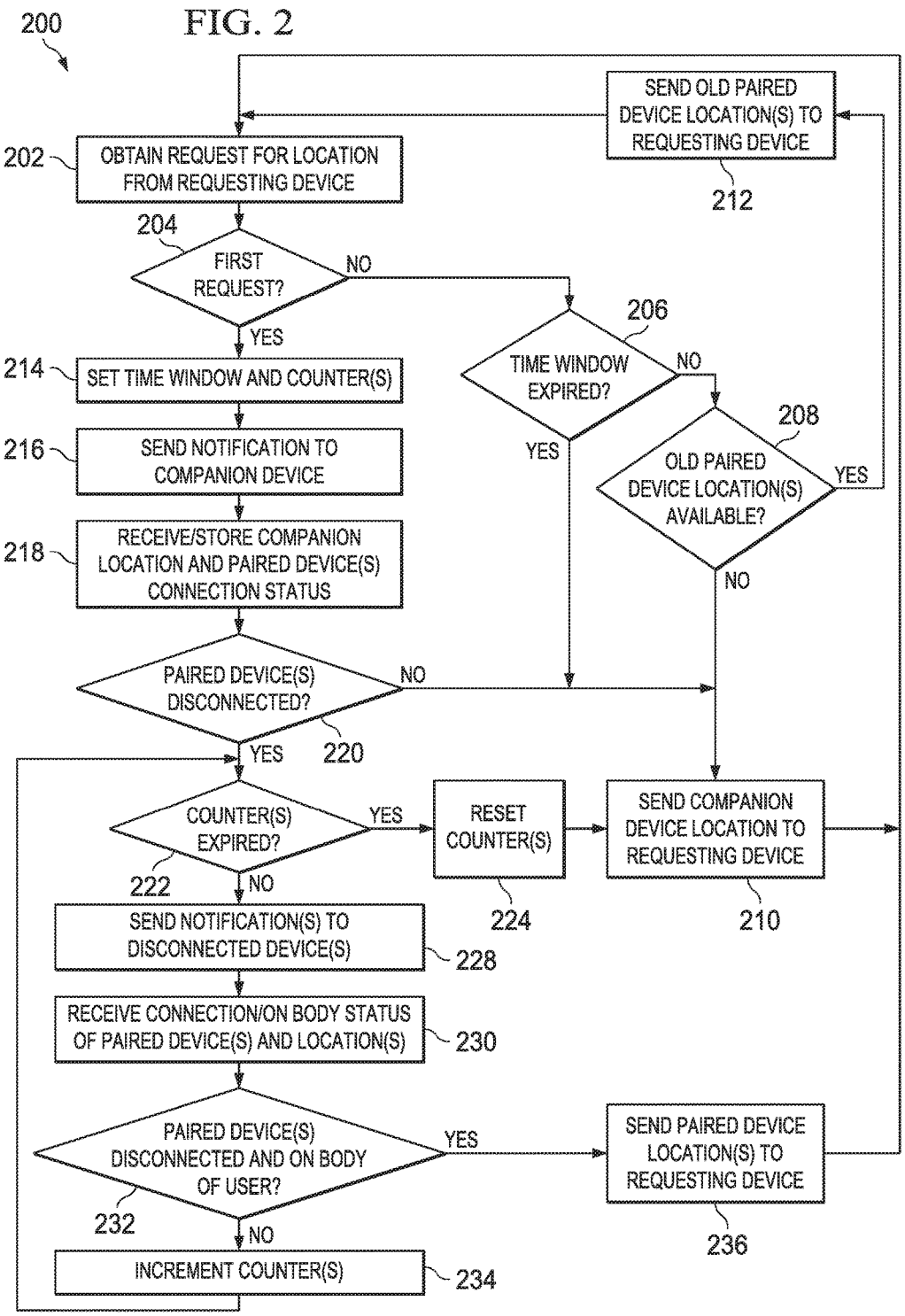
FIG. 2 is a flow diagram of an example process for managing location sharing requests, according to an embodiment.

FIG. 2 is a flow diagram of an example process 200 for managing location sharing requests, according to an embodiment. Process 200 can be performed by a server computer (e.g., server computer(s) 102), which can be implemented using the architecture shown in FIG. 4.

Process 200 can begin by obtaining a request from a requesting device operated by a first user for the location of a second user (202). The request can be sent by the first user via a requesting device in communication with the server computer. For example, the first user can request the location of the second user (e.g., a friend) and the request is processed by a location sharing application running on the server. If (204) the request is a first request for the second user's location, the server sets a time window and one or more counters (214) associated with paired devices registered with the second user and starts a timer for the time window. Multiple devices can be registered with the location tracking application by the first user and the second user. For example, the first user and second user can register with the location sharing application using a Web page provided by a Web page server. Registration can include one or more authentication procedures to protect the privacy of the first and second user.

Process 200 can continue by sending a notification to a registered companion device of the second user (216). For example, the companion device can be a smartphone. In response to the notification, the companion device sends its location and a list of paired devices and corresponding connection status for each paired device, which is received and stored by the server computer (218). If (220) none of the paired devices are disconnected from the companion device, then the server computer sends the location of the companion device to the requesting device (210).

If (220) at least one paired device is disconnected, and if (222) a counter corresponding to the disconnected device has not expired, the server computer sends a notification to each disconnected paired device (228). In response to the notification, each paired device will respond with a connection status, on body status and location or will not respond at all to the notification. The responses are received and stored by the server computer (230). If (232) a paired device is disconnected from the companion device, is on the body of the user (e.g., worn or carried by the user) and has sent its location, then the server computer sends the location of the paired device to the requesting device (236). If (232) no paired device responds or responds with a connected status or off body status, a counter for the paired device is incremented (or decremented). If (222) the counter expires (e.g., a threshold count is reached if incrementing or a count of zero is reached if decrementing), then the counter(s) are reset (224) and server sends the location of the companion device to the requesting device (210).

If (204) the request is not a first request for the location of the second user, and if (206) the time window has expired, then the server computer sends the location of the companion device to the requesting device (210). If (204) the request is not a first request for the location of the second user, and if (206) the time window has not expired, and if (208) an old location of the paired device is available, then the old location of the paired device is sent by the server computer to the requesting device (212).

Figure 3:
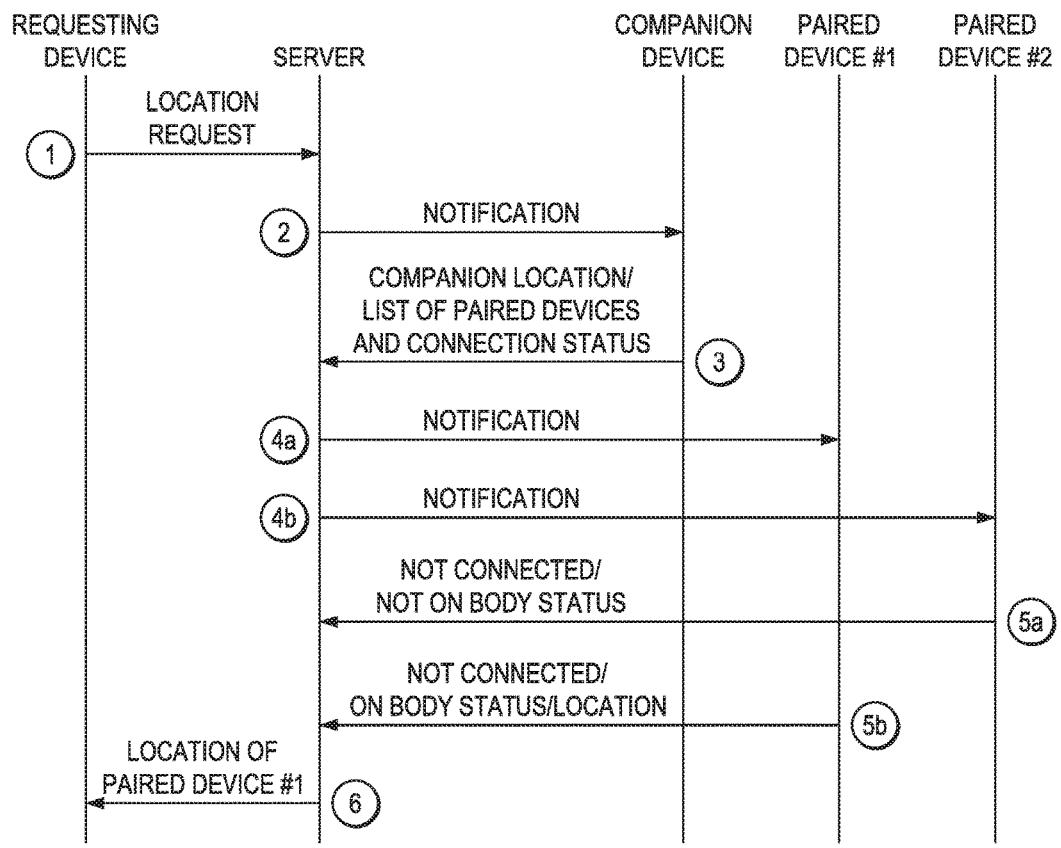
FIG. 3 is an event diagram of an example process for managing location sharing requests, according to an embodiment.

FIG. 3 is an event diagram of an example process for managing location sharing requests, according to an embodiment. In this example use case, each event is initiated by at least one of a requesting device, server computer, companion device and two paired devices. Each event is labeled with a numerical designator to indicate the order of the events. Events with the same numerical designator are considered to be part of the same event and may occur (but do not have to occur) in parallel.

During event 1 the requesting device sends a location request to the server computer. During event 2 the server computer sends a notification to the companion device. During event 3, the companion device responds with its location, a list of paired devices and connection status for each paired device. During events 4a, 4b, the server computer sends notifications to paired device #1 and paired device #2. During events 5a, 5b, the paired devices respond to their respective notifications. The responses include device locations, connection status and body status. In this example, paired device #2 responds with disconnected status and off body status, and paired device #1 responds with connected status and on body status. During event 6, the server computer sends the location of paired device #1 to the requesting device.

As described in reference to FIG. 2, if neither paired device #1 nor paired device #2 replies to their respective notification with a disconnected and on body status or neither respond (because they are offline, or otherwise disabled), then during event 6 the server computer sends the location of the companion device received during event 3 to the requesting device. The events 1-6 are subject to expiration of a time window and counters for communication attempts as described in reference to FIG. 2.

Figure 4:
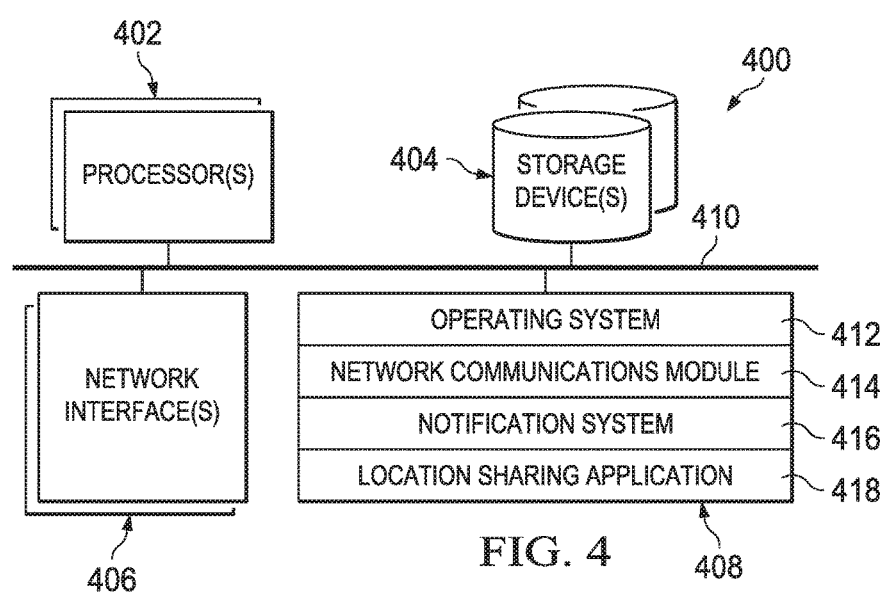
FIG. 4 is a block diagram of example server computer architecture for implementing the features and processes described in reference to FIGS. 1-3, according to an embodiment.

FIG. 4 is a block diagram of example server architecture for implementing the features and processes described in reference to FIGS. 1-3, according to an embodiment. Other architectures are possible, including architectures with more or fewer components. In some implementations, architecture 400 includes one or more processor(s) 402 (e.g., dual-core Intel® Xeon® Processors), one or more network interface(s) 406, one or more storage device(s) 404 (e.g., hard disk, optical disk, flash memory) and one or more computer-readable medium(s) 408 (e.g., hard disk, optical disk, flash memory, etc.). These components can exchange communications and data over one or more communication channel(s) 410 (e.g., buses), which can utilize various hardware and software for facilitating the transfer of data and control signals between components.

The term "computer-readable medium" refers to any medium that participates in providing instructions to processor(s) 402 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 408 can further include operating system 412 (e.g., Mac OS® server, Windows® NT server), network communication module 414, notification system 416 and location sharing application 418. Operating system 412 can be multi-user, multiprocessing, multitasking, multithreading, real time, etc. Operating system 412 performs basic tasks, including but not limited to: recognizing input from and providing output to devices 402, 404, 406 and 408; keeping track and managing files and directories on computer-readable medium(s) 408 (e.g., memory or a storage device); controlling peripheral devices; and managing traffic on the one or more communication channel(s) 410. Network communications module 414 includes various components for establishing and maintaining network connections (e.g., software for implementing communication protocols, such as TCP/IP, HTTP, etc.).

Architecture 400 can be included in any computer device, including one or more server computers in a local or distributed network each having one or more processing cores. Architecture 400 can be implemented in a parallel processing or peer-to-peer infrastructure or on a single device with one or more processors. Software can include multiple software components or can be a single body of code.

Example Device Architecture

Figure 5:
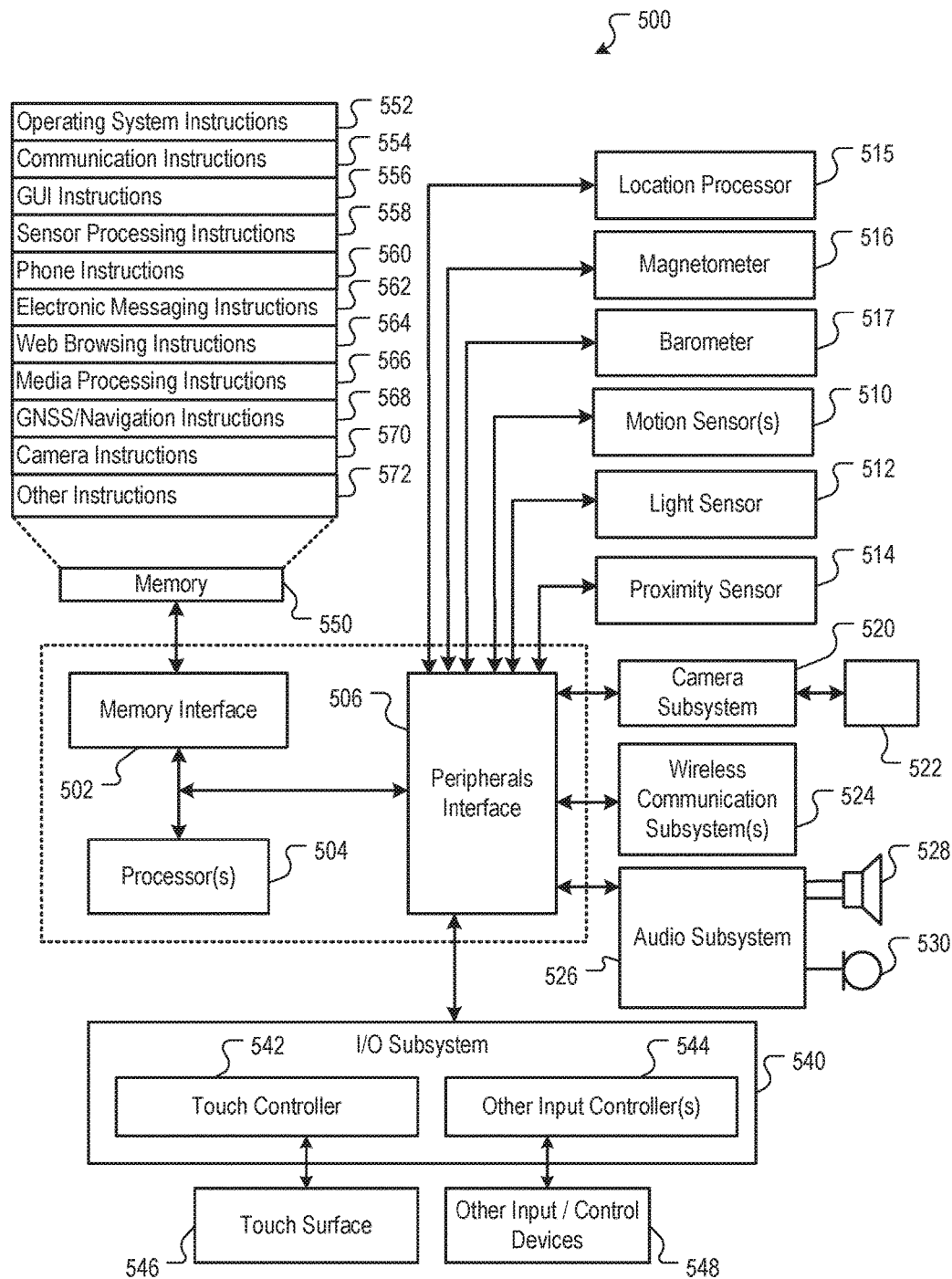
FIG. 5 is a block diagram of example device architecture for implementing the features and processes described in reference to FIGS. 1-3, according to an embodiment.

FIG. 5 is a block diagram of example device architecture 500 for implementing the features and processes described in reference to FIGS. 1-3. Architecture 500 may be implemented in any mobile device for generating the features and processes described in reference to FIGS. 1-3, including but not limited to companion devices and paired devices such as smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor(s) 510, light sensor 512, and proximity sensor 514 may be coupled to peripherals interface 506 to facilitate orientation, lighting, and proximity functions of the mobile device. For example, in some implementations, light sensor 512 may be utilized to facilitate adjusting the brightness of touch surface 546. In some implementations, motion sensor(s) 510 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication sub system(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, iOS, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for providing a location sharing client application and implement some of the features and processes described in reference to FIGS. 1-3. The GPS/Navigation instructions 568 include instructions for estimating location, including but not limited to an extended Kalman filter and other processes for estimating location.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, from a requesting device or a server computer in communication with the requesting device, a first location sharing request associated with a user;
sending a notification to a companion device associated with the user;
receiving, from the companion device, a location of the companion device, a list of one or more devices associated with the user that are paired with the companion device and a connection status for at least one of the one or more paired devices, the connection status indicating whether or not there is a direct communication link established between the paired device and the companion device;
sending a notification to each disconnected paired device based on the connection status;
receiving, from the disconnected paired device, a location of the disconnected device and data indicating whether or not the device is worn or carried by the user; and
responsive to the data indicating that the device is worn or carried by the user, sending to the requesting device or the server computer the location of the disconnected device, and responsive to the data indicating that the device is not worn or carried by the user, sending to the requesting device or server computer the location of the companion device.

2. The method of claim 1, further comprising:
receiving a second location sharing request;
determining if the request was received in a time window; and
responsive to the second location sharing request being received in the time window, sending to the requesting device or server computer the location of the disconnected device.

3. The method of claim 1, wherein the data indicating that the device is worn or carried by the user indicates that the device is worn on a wrist of the user.

4. The method of claim 1, further comprising:
incrementing or decrementing a counter associated with a paired device each time an attempt to locate the paired device fails; and responsive to the counter exceeding a specified count, sending to the requesting device or the server computer the location of the companion device.

5. The method of claim 4, wherein the counter associated with a paired device is reset if a connection status or on body status of the paired device changes.

6. The method of claim 4, wherein the counter associated with a paired device is reset if the paired device reconnects to the companion device.

7. The method of claim 1, wherein the companion device is a smartphone and at least one paired device is a wearable computer.

8. A system comprising:
one or more processors;
memory operable to store instructions, which, when executed by the one or more processors, causes the one or more processors to perform operations comprising:
receiving, from a requesting device or a server computer in communication with the requesting device, a first location sharing request associated with a user;
sending a notification to a companion device associated with the user;
receiving, from the companion device, a location of the companion device, a list of one or more devices associated with the user that are paired with the companion device and a connection status for at least one of the one or more paired devices, the connection status indicating whether or not there is a direct communication link established between the paired device and the companion device;
sending a notification to each disconnected paired device based on the connection status;
receiving, from the disconnected paired device, a location of the disconnected device and data indicating whether or not the device is worn or carried by the user; and
responsive to the data indicating that the device is worn or carried by the user, sending to the requesting device or the server computer the location of the disconnected device, and responsive to the data indicating that the device is not worn or carried by the user, sending to the requesting device or server computer the location of the companion device.

9. The system of claim 8, the operations further comprising:
- receiving a second location sharing request;
- determining if the request was received in a time window; and
- responsive to the second location sharing request being received in the time window, sending to the requesting device or server computer the location of the disconnected device.

10. The system of claim 8, wherein the data indicating that the device is worn or carried by the user indicates that the device is worn on a wrist of the user.

11. The system of claim 8, the operations further comprising:
- incrementing or decrementing a counter associated with a paired device each time an attempt to locate the paired device fails; and responsive to the counter exceeding a specified count, sending to the requesting device or the server computer the location of the companion device.

12. The system of claim 11, wherein the counter associated with a paired device is reset if a connection status or on body status of the paired device changes.

13. The system of claim 11, wherein the counter associated with a paired device is reset if the paired device reconnects to the companion device.

14. The system of claim 8, wherein the companion device is a smartphone and at least one paired device is a wearable computer.

15. A non-transitory, computer-readable storage medium having instructions stored thereon, which, when executed by one or more processors, causes the one or more processors to perform operations comprising:
- receiving, from a requesting device or a server computer in communication with the requesting device, a first location sharing request associated with a user;
- sending a notification to a companion device associated with the user;
- receiving, from the companion device, a location of the companion device, a list of one or more devices associated with the user that are paired with the companion device and a connection status for at least one of the one or more paired devices, the connection status indicating whether or not there is a direct communication link established between the paired device and the companion device;
- sending a notification to each disconnected paired device based on the connection status;
- receiving, from the disconnected paired device, a location of the disconnected device and data indicating whether or not the device is worn or carried by the user; and
- responsive to the data indicating that the device is worn or carried by the user, sending to the requesting device or the server computer the location of the disconnected device, and responsive to the data indicating that the device is not worn or carried by the user, sending to the requesting device or server computer the location of the companion device.

16. The non-transitory, computer-readable storage medium of claim 15, further comprising:
- receiving a second location sharing request;
- determining if the request was received in a time window; and
- responsive to the second location sharing request being received in the time window, sending to the requesting device or server computer the location of the disconnected device.

17. The non-transitory, computer-readable storage medium of claim 15, wherein the data indicating that the device is worn or carried by the user indicates that the device is worn on a wrist of the user.

18. The non-transitory, computer-readable storage medium of claim 15, further comprising:
- incrementing or decrementing a counter associated with a paired device each time an attempt to locate the paired device fails; and responsive to the counter exceeding a specified count, sending to the requesting device or the server computer the location of the companion device.

* * * * *